Aug. 20, 1957    N. J. STODDARD ET AL    2,803,109
METHOD OF PROCESSING THERMOPLASTIC YARNS
Filed Jan. 4, 1954    4 Sheets-Sheet 3

FIG_3

INVENTORS:
Nicholas J. Stoddard &
BY Warren A. Seem,
Paul & Paul
ATTORNEYS.

Aug. 20, 1957  N. J. STODDARD ET AL  2,803,109
METHOD OF PROCESSING THERMOPLASTIC YARNS
Filed Jan. 4, 1954  4 Sheets-Sheet 4

INVENTORS:
Nicholas J. Stoddard &
Warren A. Seem,
BY Paul & Paul
ATTORNEYS.

United States Patent Office 2,803,109
Patented Aug. 20, 1957

2,803,109

METHOD OF PROCESSING THERMOPLASTIC YARNS

Nicholas J. Stoddard, Philadelphia, and Warren A. Seem, Gwynedd, Pa., assignors, by mesne assignments, to Universal Winding Company, Cranston, R. I., a corporation of Massachusetts Application January 4, 1954, Serial No. 401,951

11 Claims. (Cl. 57—157)

This invention relates to methods of processing thermoplastic yarns such as nylon, Vinyon, Orlon, Velon, Dacron, saran, and the like (as distinguished from silk, rayon, cotton, linen or wool, etc.). Thermoplastic yarns of the kind referred to materially respond to shrinking by becoming more ductile or plastic and thermally stabilized in cooling which, after subjected to the action of heat assume new and substantially permanent physical characteristics when twisted, stretched or shrunk while heated. The invention is especially concerned with the production of substantially permanently crimped, wavy or fluffed thermoplastic yarns, and also with the production of straight compact thermoplastic yarns of the kinds disclosed in U. S. Patents Nos. 2,353,666 and 2,411,132 granted to Berkley L. Hawthorne and Robert W. Seem, respectively, on July 18, 1944 and on November 12, 1946.

The chief aim of our invention is to provide a simple, continuous, rapid and economical method for commercially producing uniformly processed, continuous filament thermoplastic yarns having increased elasticity and the appearance of spun yarn; improved thermoplastic spun yarns having a substantially permanent uniform crimp, wave or fluff and increased elasticity; improved continuous filament and discontinuous filament thermoplastic yarns having a substantially permanently reduced luster; thermoplastic yarns characterized as set forth in the two patents supra; and substantially improved thermoplastic crepe yarns.

The above objects are broadly realized though the utilization of our method of thermally processing fully disclosed in a separate U. S. patent application No. 401,803 concurrently filed herewith, in combination with our herein disclosed method of utilizing the apparatus of the attached drawings, wherein.

Figure 4:
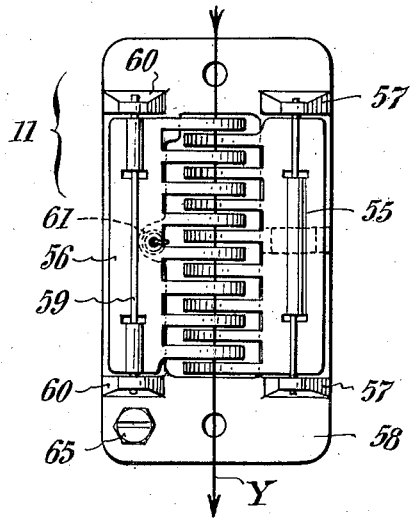
Figure 5:
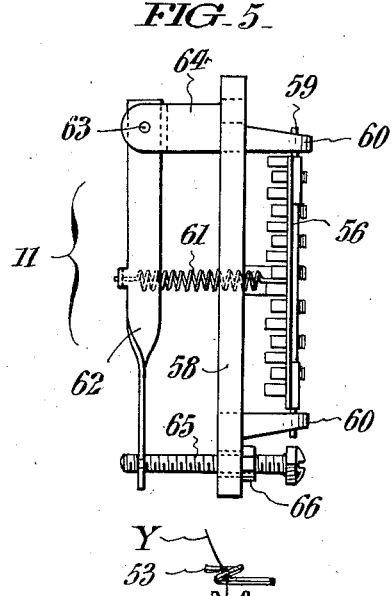
Figure 6:
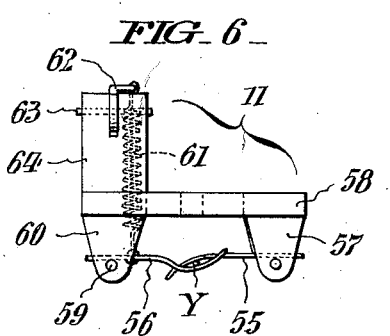
Figure 7:
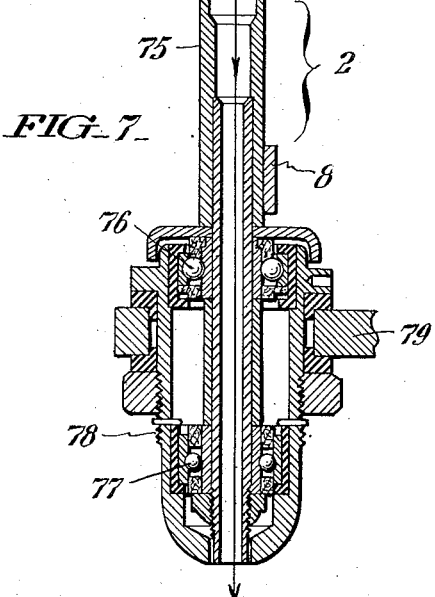

Figs. 4, 5 and 6 respectively, are a front view, a side elevation and a top plane view likewise drawn to a larger scale, of a specially constructed tensioning device embodied in the apparatus; and Fig. 7 is a large scale axial sectional view of a specially constructed twisting and untwisting spindle also embodied in the apparatus.

The apparatus herein shown is basically what is known in the textile art as an "up-twister" such as is ordinarily employed in twisting yarns. One of the usual guides for distributing the processed yarn upon the corresponding revolving take-up spool S is indicated at 3, the usual traverse bar for the guide at 4, the usual roll for driving the spool at 6, the usual driven shaft for the roll at 7, and the usual spindle driving belt at 8.

To convert such an up-twister to the purposes of our invention, we have provided a special overhead creel 9 for supporting the package P of thermoplastic yarn Y which is to be processed, a specially constructed heating device 10, a specially constructed yarn tensioning device 11, and a specially constructed twisting and untwisting spindle 2. As shown, the heating device 10 and the tensioning device 11 are vertically arranged, the latter above the former, in the vertical interval between the spindle 2 and the take-up spool S.

Figure 1:
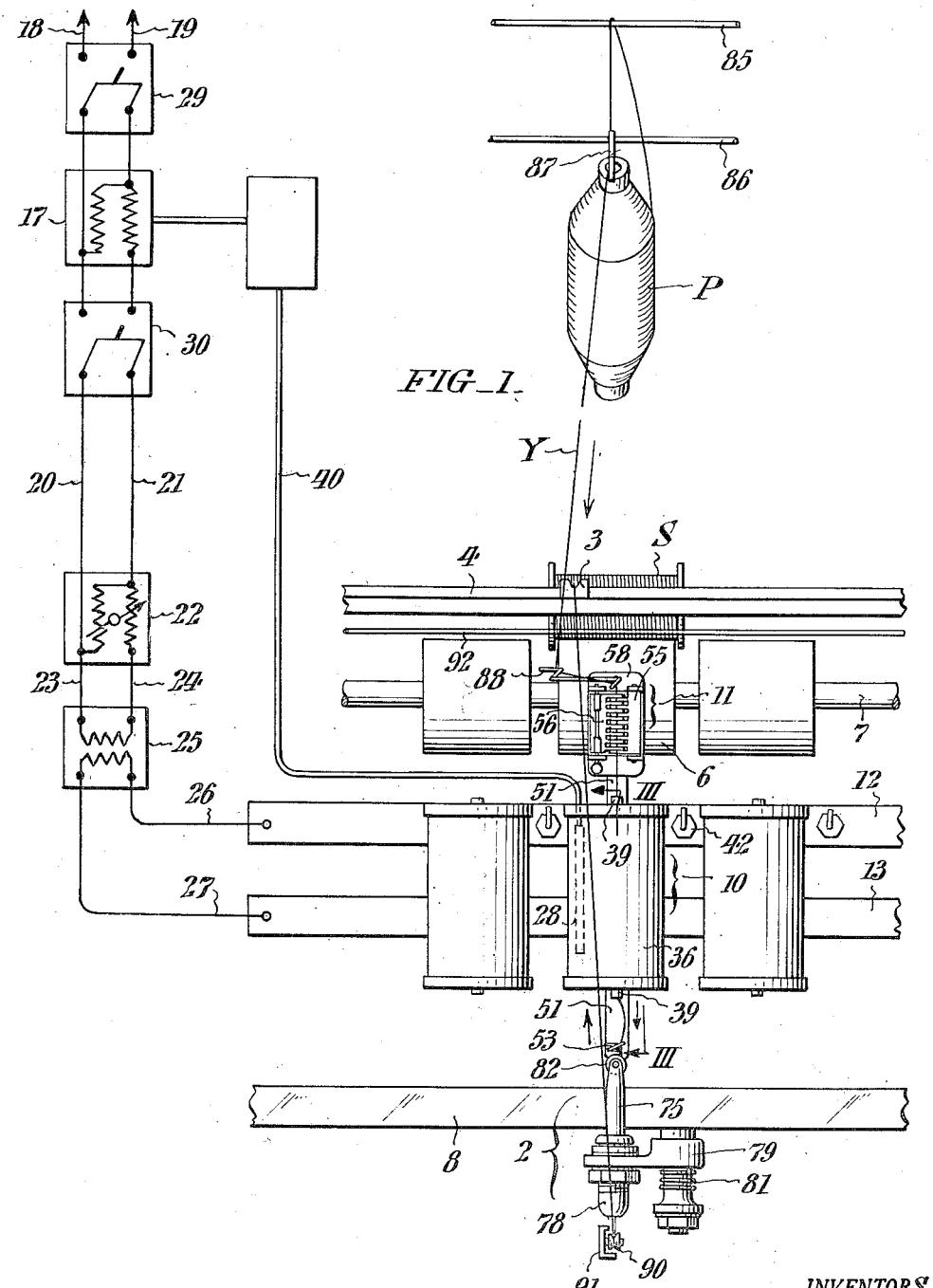
Fig. 1 is a fragmentary view, in front elevation, of an apparatus suitable for carrying out our improved method of producing thermoplastic yarns having various improved physical characteristics.
Figure 2:
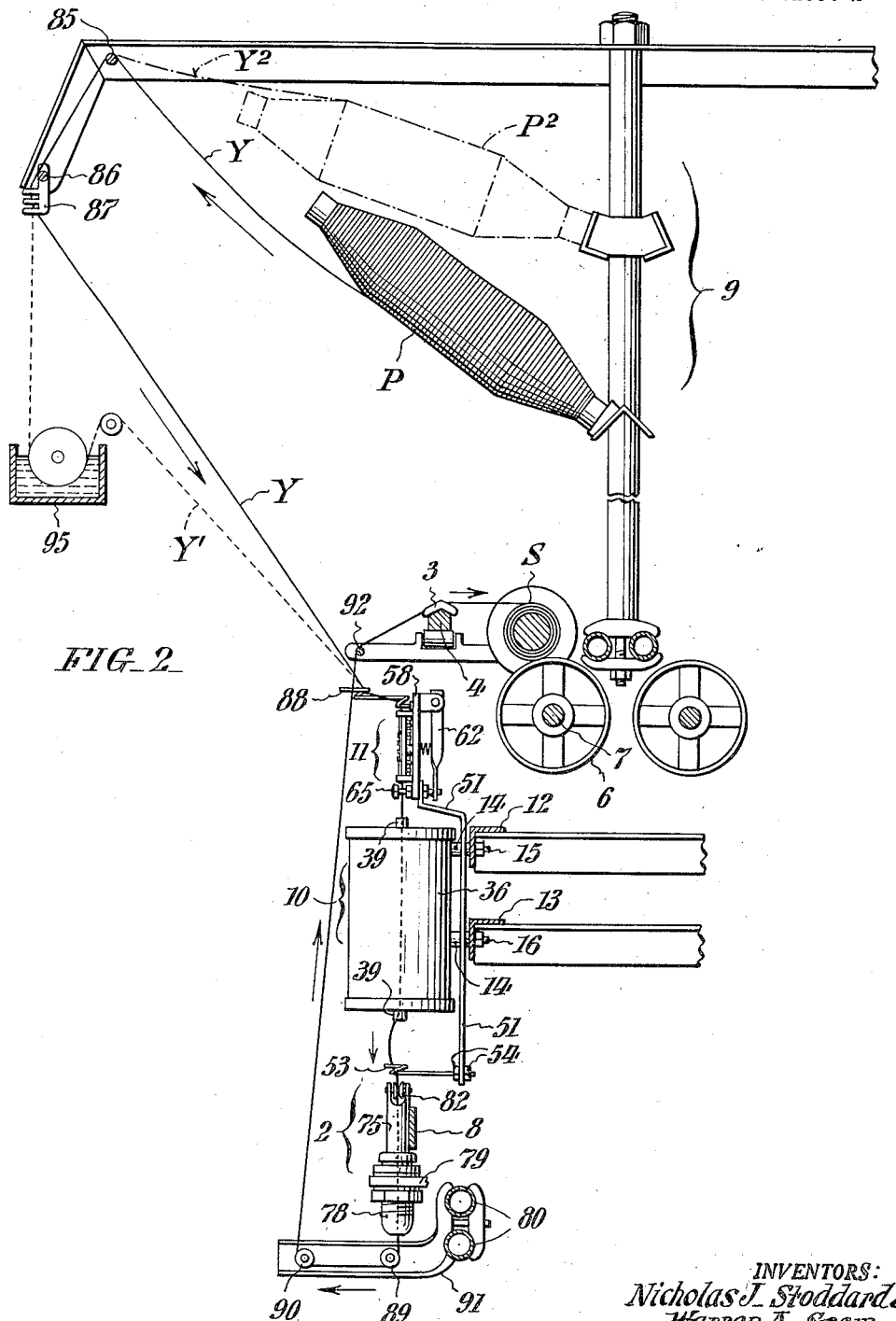
Fig. 2 is a fragmentary view of the apparatus in cross section.
Figure 3:
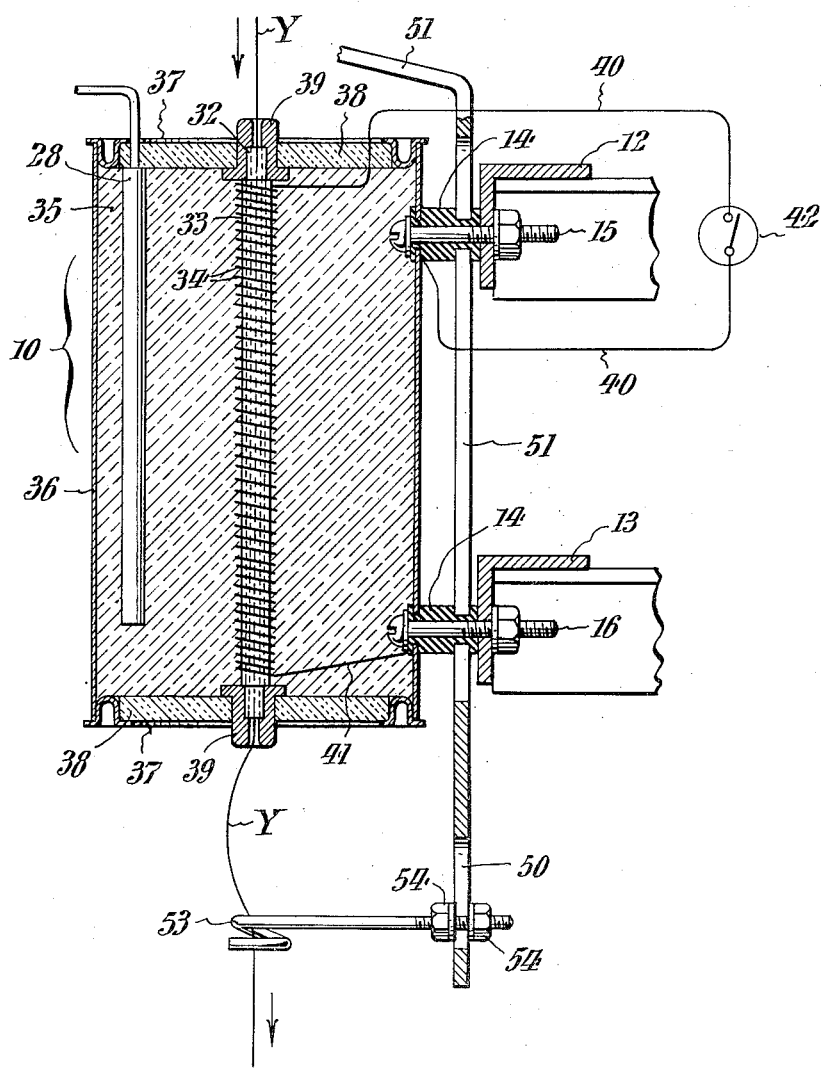
Fig. 3 is a fragmentary view in section taken as indicated by the angled arrows III—III in Fig. 1, drawn to a larger scale and showing a specially constructed heating unit embodied in the apparatus.

As later on explained, the device 10 is electrically heated, current being conducted to it through two fixed horizontally-arranged bus bars 12 and 13 whereto said device is secured, with interposition of insulating bushings 14 as best shown in Figs. 2 and 3, by screws 15 and 16. The required degree of heat is uniformly maintained in the device by current at a constant voltage (not exceeding twenty-four volts for personal safety) through an automatic induction voltage regulator 17 from a power line 18, 19, said regulator being connected by conductors 20, 21 to a manually-adjustable induction voltage regulator 22 connected, in turn, by conductors 23, 24 to the primary of a step down transformer 25 in circuit through conductors 26, 27 with the bus bars 12, 13. The output voltage of the induction voltage regulator 17 is automatically governed by a thermally responsive sensing means 28 incorporated in the heating device 10. The automatic and manual induction voltage regulators 17 and 22 and the thermostatic sensing means 28 may all be of any approved standard commercially available types through cooperation of which the temperature in the heating device 10 is modulated compensatively with changes in ambient or room temperature and transfer of heat therefrom to the yarn travelling thereto. Also included in the lines 18, 19 and 20, 21 respectively, are manually operable safety hand switches 29 and 30.

With reference now to Fig. 3, it will be seen that the heating device comprises a central tube 32 which, it is to be understood, is of non-ferrous material and of small diameter and bore, and through which the yarn Y is passed; said tube being provided exteriorly with a thin coat 33 of glass or other insulating material, and surrounded by a coil 34 of resistance wire. As further shown, tube 32 is embedded in a thick walled jacked 35 of thermal insulation, which may be of fiber glass or the like, encased in a metallic shell 36. At its opposite end the shell 36 is closed by sealed covers 37 which may also be of metal, with interposition between them and the insulation, of disks 38 formed from "Transite" or the like to minimize thermal transfer from the hot tube through said shell to the exterior and vice versa. Engaged over the opposite ends of tube 32 and extending through the disks 38, are hard wear-resistant bushings 39 of porcelain or the like which prevent cutting of the tube by the passing yarn. It is to be particularly noted that the winding pitch of heating coil 34 increases progressively from the bottom end of tube 32 at which the yarn enters to the mid height of the tube, and then progressively decreases at a corresponding rate toward the end at which the yarn emerges. Accordingly, a greater amount of electrical energy is available at the entrant and the exit ends of tube 32, thereby insuring uniform heat distribution and making possible the use of a much shorter tube than otherwise would be required. The lead 40 from one end of the coil 34 is extended through the insulating jacket 35 to screw 15, and the lead 41 from the other end of said coil to the screw 16, and interposed in lead 40 is a manually operable switch which is diagrammatically indicated at 42. The tensioning means 11 is supported at the upper end of a vertical bracket bar 51 which is secured to the bus bars 12 and 13 by the screws 15 and 16 and insulated therefrom by the bushings 14. The pigtail guide indicated at 53 has its shank extending through a vertical slot 50 in the lower end of the upright bracket bar 51 so as to be vertically adjustable in the interval between the heating device 10 and the spindle 2, said guide being securable in adjusted positions by the clamps nuts indicated at 54.

As shown in Figs. 4, 5 and 6, the tensioning device 11 comprises two comb-like vanes 55 and 56 between the alternating tines of which the yarn Y is passed. Vane 55 is fixedly supported between a pair of vertically-spaced forwardly-projecting lugs 57 of a bracket plate 58, while vane 56 is swingable about a hinge pin 59 between another pair of vertically-spaced forwarding-projecting lugs 60 of said plate. The swingable vane 56 is connected by a tension spring 61 to a vertical lever 62 fulcrumed at 63 on a rearward projection 64 at the top of the plate 58. The lower or distal end of lever 62 bears against a screw 65 threadedly engaged in plate 58. By means of screw 65, it is possible to vary the force of the spring 61 and, in turn, the pressure exerted by the vane 56 upon the yarn Y to regulate the drag or tension imparted thereto. The jam nut at 66 serves as a means for securing the screw 65 against accidental displacement in adjusted position.

As shown in Fig. 7, the spindle 2 comprises an upright tube 75 of small diameter and bore which is rotatively supported at its lower end by a pair of vertically-spaced anti-friction ball bearings 76 and 77. These bearings are housed within a cylindric holder 78 set into a retractable arm 79 which is swingably connected in the usual manner from the fixed horizontal rods 80 in the lower part of the apparatus, and which is normally maintained in the position shown by a torsion spring 81 with the tube in tangential contact with the driving belt 8. Freely revolvable about a transverse pin at the upper end of the tube 75 is a small inset V grooved reverse twisting roller 82 around which the yarn Y is wrapped one or more times before passing downward through the tube. Being of small diameter and thin walled, the spindle tube 75 is light in weight and dynamically balanced, and can therefore be revolved at high speeds by the contacting drive belt 8 as will be readily understood.

The thermoplastic Y yarn to be processed is drawn endwise from the supply package P on the creel 9, passed over guide rods 85, 86 and a guide eye 87 also on the creel, then downwardly to a pigtail guide 88 provided on plate 58 of the tensioning device 1, then down between the wings of the tensioning device 11 and through the tube 32 of heating device 10, then through the pigtail guide 53, then through the spindle 2, then horizontally under a pair of spaced rolls 89 and 90 on a bracket arm 91 reaching forward from the rods 80, then upwardly over a fixed longitudinal guide rod 92 to the traverse guide 3, and finally to the driven take-up spool S.

We have herein described and shown in the drawings a conventional up-twister converted to carry out our methods of processing, but any type of twisting machine may be similarly converted or a machine specially constructed for the purpose. The essential elements of apparatus to carry out our methods are (1) a yarn supply creel, (2) a restricted isolated heated zone capable of regulation to uniformly heat a travelling yarn up to the melting point of the yarn, (3) means for cooling the heated yarn; (4) a yarn tensioning means capable of adjustment to uniformly apply correlated yarn tension up to the breaking point of the yarn, (5) a driven twisting-untwisting spindle such as herein described, and (6) a driven take-up package.

*Operation*

For the purposes of illustration, let it be assumed that the yarn Y is in the form of a continuous multi-filament of nylon or the like. As the yarn continually passes down through the device 10 it is uniformly heated to a temperature within twenty degrees of the melting point of the thermoplastic. This temperature is predetermined by adjustment of the manual induction voltage regulator 22 in accordance with the uniform linear speed at which the yarn travels, the temperature being automatically modulated compensatively with changes in ambient or room temperature and transfer of heat to the travelling yarn by action of the sensing means 28 upon the automatic induction voltage regulator 17, and the device 11 being adjusted for impartation of the uniform desired tension during the heating. While in a heated plastic state, the yarn is twisted in one direction as it traverses the restricted heated zone of the device 10 by the action of the rapidly revolving spindle 2 and cooled by ballooning as it advances downward in the interval between the outlet end of the tube 32 of said device and the wheel 82, the yarn being wrapped for positive control, one or more times about the small wheel 82 of the untwisting spindle 2 as previously explained, and the cooling being promoted by contact of the yarn with the face of the wheel 82 and the smooth sloping groove sides of said wheel. By action of the transverse rotation or movement of the wheel 82, the yarn is reversely twisted as it looses frictional contact with wheel 82 and passes down through the tube 75 of the spindle to the guide wheel 89 and after rounding the latter and the guide wheel 90, it travels upward and after passing over the rod 92 and the traverse guide 3 it is continually taken up by the revolving spool S. As a result of this continuous processing in accordance with our invention, an improved substantially permanent crimp, wave or fluff is set into the yarn. By this it is meant that the yarn is yarn-set, that is, the molecules in the thermoplastic yarn are permanently and uniformly reoriented or realigned therein according to the twisted formation of the yarn at the time of yarn-setting so that the individual filaments of the yarn have an inherent tendency to twist uniformly and assume the twisted formation which they had at the time of yarn-setting. Twisting-untwisting in the manner above described results in a yarn of improved uniform crimp or wave, because by this continuous method it is mechanically impossible to remove more or less twist than the identical amount of twist inserted.

The normal prior art procedure requires five independent operations of (1) redrawing to a spinner bobbin, (2) the twisting of the yarn, (3) the setting of the twist, (4) again redrawing to spinner bobbins, and (5) the untwisting; whereas by our continuous method one simple operation involving no more in energy and labor than that normally required for merely performing the one operation of twisting is required, and furthermore doubling prior to or after twisting-untwisting may be carried out by our method without adding to energy or labor requirements. Care must, of course, be exercised to maintain the proper correlation between heat, speed and tension, for if the yield value of the heated yarn being processed is intermittent or uniformly exceeded by tensile stress, the resultant yarn, after untwisting, will be uneven and lack uniform crimp, wave or fluff and the degree of the crimp, wave or fluff will be relative to the degree to which the tension exceeds the yield value. The portions of the yarn where the tensile stress exceeds the yield value of the heated yarn will assume the appearance and other characteristics of monofilament yarn. The degree and permanency of the crimp, wave or fluff is attained by maintaining the treating temperature well up to the melting or equivalent point of the thermoplastic, i. e., not less than forty percent below the melting or equivalent point. By maintaining a low tension relative to the contractile force of the heated yarn, the yarn will be permitted to shrink in the processing, while by subjecting it to a relatively high tension a corresponding amount of stretching or elongation will take place during the heating.

A spun yarn originally formed from thermoplastic staple or fibers when processed according to our invention will of course be attended by results similar to those described above in connection with a continuous multi-filament thermoplastic yarn. Crimp, wave or fluff, as herein referred to, is the result of the individual filaments comprising a yarn assuming a crimped, wavy or curly formation, thereby precluding their previous parallel relationship. Consequently our process applied to monofilament yarn cannot produce the same effect, but rather causes delustering and the impartation of useful active and latent torsional forces.

If desired the yarn may be dyed or sized as an incident to the processing in accordance with our invention, by passing it through a dye or sizing applicator such as shown at 95 in Fig. 2 en route to the heating device 10, the diverted path of the yarn being indicated at Y' in dotted lines. In passage of the yarn through the heating device 10, the dye is developed and set by the elevated temperature of the restricted heating zone, or the sizing is dried as will be readily understood.

In accordance with our invention, it is also possible to produce straight compact twisted thermoplastic yarns of the kinds disclosed in U. S. Patents Nos. 2,353,666 and 2,411,132 and improvements thereon including nylon and other thermoplastic crepe yarns of either smooth or rough texture, depending upon the final twist and the correlation of the temperature and tension of the twisting-untwisting operation.

By prior art methods the teachings of the above referred to patents are carried out in three basic steps of (1) twisting 3% to 60% beyond the twist desired in the final yarn, (2) the setting of the twist, and (3) the reverse twisting the degree to which it was purposely overtwisted; whereas by our method the overtwisting, the twist setting (if required) and the removal of the excess twist are carried out in one economical continuous operation. By our method the entire length of the yarn becomes substantially improved both in yarn physical properties and uniformity thereof, and uniformity and degree of set of the twist; because of our uniform heating and correlated tensioning, and also because our method entails the overtwisting and reverse twisting the identical amount, substantial improvements in uniformity of twist and degree of torsion in the completed yarn results.

We have discovered that by using undrawn thermoplastic yarns we can produce the herein referred to crimped, wavy or fluffed yarns, highly twisted straight compact yarns, crepe yarns and new and useful thermoplastic yarns, utilizing substantially less or no heating of the yarn. By the use of adequate tension while twisting-untwisting, we can draw the yarn approximately the same degree as normally drawn by the producers, and by this method the ductile yarn is drawn helically due to the simultaneous twisting and drawing and this spiralled formation of the yarn substantially remains after untwisting. Thus in the case of yarns having thermal characteristics such as Dacron for example, which exhibits substantial ductility when heated, the yarn is processed under sufficient high tension during heating to preclude substantially any ductility in the finished yarn when cooled.

Having thus described our invention, we claim:

1. A method of producing evenly and permanently crimped, wavy or fluffed multi-filament thermoplastic yarn having improved and uniform physical characteristics which comprises, continually drawing the yarn from a source of supply, continually twisting the yarn drawn from said supply, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone to thereby maintain said heated zone uniformly at the temperature required to uniformly heat said yarn to said prescribed temperature, continually cooling the yarn to stabilize the same after passage under tension through said heated zone, continually untwisting the yarn after cooling the same, and finally continually collecting the processed yarn, the tension upon the heated yarn being correlated to said prescribed temperature of the heated yarn to maintain the yarn under tension adequate to preclude substantially any ductility in the cooled yarn.

2. A method of producing evenly and permanently crimped, wavy or fluffed multi-filament thermoplastic yarn having improved and uniform physical characteristics which comprises, continually drawing the yarn from a source of supply, continually twisting the yarn drawn from said supply, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone to thereby maintain said heated zone uniformly at the temperature required to uniformly heat said yarn to said prescribed temperature, correlating the tension in said yarn to said prescribed temperature and linear speed of travel of the yarn to maintain the yarn at a selected uniform tension relative to the contractile force of the yarn resulting from heating and twisting the same to preclude substantially any ductility in the yarn after cooling, continually cooling the yarn to stabilize the same after passage thereof under tension through said heated zone, continually untwisting the yarn after cooling the same, and finally continually collecting the processed yarn.

3. A method of producing evenly and permanently crimped, wavy or fluffed multi-filament thermoplastic yarn having improved and uniform physical characteristics which comprises, continually drawing the yarn from a source of supply, continually twisting the yarn drawn from said supply, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a selected uniform tension less than the contractile force of the yarn resulting from heating and twisting the same to preclude substantially any ductility in the yarn after cooling, continually cooling the yarn to stabilize the same after passage thereof under tension through said heated zone, continually untwisting the yarn after cooling the same, and finally continually collecting the processed yarn.

4. A method of producing evenly and permanently crimped, wavy or fluffed multi-filament thermoplastic yarn having improved and uniform physical characteristics which comprises, continually drawing the yarn from a source of supply, continually twisting the yarn drawn from said supply, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a uniform tension at least as great as the contractile force of the yarn resulting from heating and twisting the same to preclude substantially any ductility in the yarn after cooling, continually cooling the yarn to stabilize the same after passage thereof under tension through said heated zone, continually untwisting the yarn after cooling the same, and finally continually collecting the processed yarn.

5. A method of producing evenly and permanently crimped, wavy or fluffed multi-filament thermoplastic yarn having improved and uniform physical characteristics which comprises, continually drawing the yarn from a source of supply, continually twisting the yarn drawn from said source, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the rate of transfer of heat to the yarn to thereby maintain said heated zone uniformly at the temperature required to uniformly heat said yarn to said prescribed temperature, continually cooling the yarn to stabilize the same after passage thereof under tension through said heated zone, continually untwisting the yarn after cooling the same, continually collecting the processed yarn, and controlling the tension upon the heated yarn relative to the contractile force and thermal characteristics of the yarn at said prescribed temperature to maintain the same under uniform tension adequate to preclude substantially any ductility in the cooled yarn.

6. A method of processing thermoplastic yarn to produce a highly twisted straight compact crepe yarn which comprises, continually drawing from a source of supply yarn already twisted at relatively high tension to the twist ultimately desired, continually imparting additional twist to the yarn in the same direction as the initial twist therein, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a uniform tension at least as great as the contractile force of the yarn resulting from heating and additionally twisting the same to preclude substantially any ductility in the yarn after cooling, continually cooling the yarn to stabilize the same after passage thereof under tension through said heated zone, continually untwisting the yarn after cooling the same, and finally continually collecting the processed yarn.

7. A method of processing thermoplastic yarn to produce highly twisted rough textured compact crepe yarn which comprises, continually drawing from a source of supply yarn already twisted at relatively low tension, continually imparting additional twist to the yarn drawn in the same direction as the initial twist therein, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a uniform tension less than the contractile force of the yarn resulting from heating and additionally twisting the same to preclude substantially any ductility in the yarn after cooling, continually cooling the yarn to stabilize the same after passage under tension through said heated zone, continually untwisting the yarn after cooling the same, and finally continually collecting the processed yarn.

8. A method of producing evenly and permanently crimped, wavy or fluffed multi-filament thermoplastic yarn having improved and uniform physical characteristics which comprises, continually drawing the yarn from a source of supply, continually twisting the yarn drawn from said supply, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a uniform tension substantially in excess of the contractile force of the yarn resulting from heating and twisting the same to preclude substantially any ductility in the yarn after cooling, continually cooling the yarn to stabilize the same after passage under tension through said heated zone, continually untwisting the yarn to the exact extent to which twisted, and finally continually collecting the processed yarn.

9. A method of processing thermoplastic yarn to produce highly twisted rough textured compact crepe yarn which comprises continually drawing from a source of supply yarn already twisted at relatively high tension to the twist ultimately desired, applying a twisting solution to the yarn, continually imparting additional twist to the yarn drawn in the same direction as the initial twist therein, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a uniform tension at least as great as the contractile force of the yarn resulting from additionally twisting the same to preclude substantially any ductility in the yarn after cooling, continually cooling the yarn to stabilize the same after passage under tension through said heated zone, continually untwisting the yarn to the identical extent of said additional twisting thereof, and finally continually collecting the processed yarn.

10. A method of producing plied yarn of which one end is of thermoplastic material and the other end is of cotton, wool or non-plastic material which comprises continually drawing the two ends from sources of supply, doubling the two ends, continually twisting the two ends, continually passing the yarn at a selected linear speed under uniform tension through a restricted thermally isolated and uniformly heated zone to uniformly heat the yarn to a prescribed temperature to reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said yarn to said prescribed temperature, correlating the tension in said yarn to said prescribed temperature and linear speed of travel of the yarn to maintain the yarn at a uniform tension relative to the contractile force of the yarn resulting from twisting the same to preclude substantially any ductility in the yarn after cooling, continually cooling the yarn to stabilize the same after passage under tension through said heated zone, continually untwisting the yarn to the exact extent of said twisting thereof, and finally continually collecting the processed yarn.

11. A method of fastly and uniformly dyeing while producing evenly and substantially permanently crimped, wavy or fluffed multi-filament thermoplastic yarn having improved and uniform physical characteristics which comprises, continually drawing the yarn from a source of supply, continually applying a dye bath to the traveling yarn, continually twisting the yarn drawn from said supply and dye bath, continually passing the yarn at a selected linear speed under uniform tension through a restricted thermally isolated and uniformly heated zone to uniformly heat the yarn to a prescribed temperature to dry and develop the dyestuff and reorient the molecules of the yarn to the twisted formation of the yarn and yarn-set the same, controlling the supply of heat energy to said zone compensatively according to the ambient temperature and rate of transfer of heat to the yarn to thereby maintain said heated zone uniformly at the temperature required to uniformly heat said dyed yarn to said prescribed temperature, continually cooling the yarn to stabilize the same after passage thereof under tension through said heated zone, continually untwisting the yarn after cooling the same, continually collecting the processed yarn, and controlling the tension upon the heated yarn relative to the contractile force and thermal characteristics of the yarn at said prescribed temperature to maintain the same under uniform tension adequate to preclude substantially any ductility in the cooled yarn.

References Cited in the file of this patent

UNITED STATES PATENTS

| | | |
|---|---|---|
| 2,111,209 | Dreyfus | Mar. 15, 1938 |
| 2,111,211 | Finlayson | Mar. 15, 1938 |
| 2,343,892 | Dodge | Mar. 14, 1944 |
| 2,411,132 | Hathorne et al. | Nov. 12, 1946 |
| 2,463,620 | Heberlein | Mar. 8, 1949 |
| 2,475,922 | Stockly | July 12, 1949 |
| 2,617,007 | Atkins | Nov. 4, 1952 |

FOREIGN PATENTS

| | | |
|---|---|---|
| 135,137 | Australia | Nov. 7, 1949 |